United States Patent
Rajter, Jr.

(10) Patent No.: US 7,028,835 B1
(45) Date of Patent: Apr. 18, 2006

(54) DISK PACKAGING

(75) Inventor: Robert G. Rajter, Jr., Lakewood, CA (US)

(73) Assignee: Rock-Tenn Shared Services, LLC, Norcross, GA (US)

( * ) Notice: Subject to any disclaimer, the term of this patent is extended or adjusted under 35 U.S.C. 154(b) by 252 days.

(21) Appl. No.: 10/703,707

(22) Filed: Nov. 7, 2003

Related U.S. Application Data

(60) Provisional application No. 60/424,518, filed on Nov. 7, 2002.

(51) Int. Cl.
*B65D 85/57* (2006.01)

(52) U.S. Cl. .................................... 206/308.1; 206/312
(58) Field of Classification Search ............. 206/308.1, 206/309–313, 459.5, 232, 493, 1.5
See application file for complete search history.

(56) References Cited

U.S. PATENT DOCUMENTS

| | | |
|---|---|---|
| 4,132,311 A | 1/1979 | Glinert |
| 4,176,744 A | 12/1979 | Borzak |
| 4,327,831 A | 5/1982 | Inaba et al. |
| 4,709,812 A | 12/1987 | Kosterka |
| 4,793,479 A | 12/1988 | Otsuka et al. |
| 4,819,799 A | 4/1989 | Nomula et al. |
| 4,895,252 A | 1/1990 | Nomula et al. |
| 5,088,599 A | 2/1992 | Mahler |
| 5,188,230 A | 2/1993 | O'Brien et al. |
| 5,205,405 A | 4/1993 | O'Brien et al. |
| 5,219,417 A | 6/1993 | O'Brien et al. |
| 5,236,081 A | 8/1993 | Fitzsimmons et al. |
| 5,248,032 A | 9/1993 | Sheu et al. |
| 5,249,677 A * | 10/1993 | Lim .................. 206/308.1 |
| 5,307,927 A | 5/1994 | Curtis et al. |
| 5,310,053 A | 5/1994 | Lowry et al. |
| 5,332,089 A | 7/1994 | Tillett et al. |
| 5,333,728 A | 8/1994 | O'Brien et al. |
| 5,366,074 A | 11/1994 | O'Brien et al. |
| 5,372,253 A | 12/1994 | O'Brien et al. |
| 5,379,890 A | 1/1995 | Mahler |
| 5,421,452 A * | 6/1995 | Hybiske .................. 206/312 |
| 5,425,448 A | 6/1995 | O'Brien et al. |
| 5,450,953 A * | 9/1995 | Reisman .................. 206/310 |
| 5,511,659 A * | 4/1996 | Bosworth ................ 206/308.1 |
| 5,526,926 A | 6/1996 | Deja |
| 5,531,321 A | 7/1996 | O'Brien et al. |
| 5,558,220 A | 9/1996 | Gartz |

(Continued)

FOREIGN PATENT DOCUMENTS

| | | |
|---|---|---|
| EP | 0 238 350 A2 | 9/1987 |
| EP | 0 269 159 A1 | 6/1988 |
| EP | 0 337 181 A1 | 10/1989 |
| EP | 0 356 539 A1 | 3/1990 |
| GB | 2 187 442 A | 9/1987 |

*Primary Examiner*—Luan K. Bui
(74) *Attorney, Agent, or Firm*—Kilpatrick Stockton LLP

(57) ABSTRACT

A case for machine readable disks, such as DVDs and the like. The case preferably comprises a plastic base and cradle for storing the disk. The cradle may have a central protrusion for securing the disk in the cradle. A liner may be adhered to the bottom of the base. The liner preferably comprises a pair of stop tabs. A pair of sleeves are preferably located on either end of the base. The sleeves are positionable from a closed position to an open position. Locking panels or tabs located within the sleeves engage the stop tabs of the liner when moving the sleeves from the closed to the open position, preventing the sleeves from sliding off the end of the base when the case is being opened. Locking panels or tabs of the sleeves also engage the stop tabs when moving the sleeves from the open to the closed position, preventing the sleeves from sliding beyond approximately the midpoint of the cradle along the base.

20 Claims, 11 Drawing Sheets

U.S. PATENT DOCUMENTS

| | | |
|---|---|---|
| 5,562,207 A | 10/1996 | O'Brien et al. |
| 5,573,120 A | 11/1996 | Kaufman et al. |
| 5,590,769 A | 1/1997 | Lin |
| D378,333 S | 3/1997 | Anderson |
| 5,634,559 A | 6/1997 | Foos et al. |
| 5,662,218 A | 9/1997 | Ladwig |
| D385,145 S | 10/1997 | VerWeyst et al. |
| 5,682,991 A | 11/1997 | Lammerant et al. |
| 5,701,997 A | 12/1997 | O'Brien et al. |
| 5,709,300 A | 1/1998 | Bolognia et al. |
| 5,746,314 A | 5/1998 | Knutsen et al. |
| 5,769,217 A | 6/1998 | Derraugh et al. |
| 5,788,068 A | 8/1998 | Fraser et al. |
| 5,799,784 A * | 9/1998 | Bosworth ............... 206/308.1 |
| 5,816,394 A | 10/1998 | O'Brien et al. |
| 5,819,926 A | 10/1998 | O'Brien et al. |
| 5,819,928 A | 10/1998 | Wynalda, Jr. |
| 5,829,582 A | 11/1998 | Ippolito et al. |
| 5,829,583 A | 11/1998 | VerWeyst et al. |
| 5,839,576 A | 11/1998 | Kim |
| D406,703 S | 3/1999 | Cole, Sr. |
| 5,884,761 A | 3/1999 | Gelardi et al. |
| D407,591 S | 4/1999 | Bolognia et al. |
| 5,894,924 A | 4/1999 | Koch |
| 5,906,274 A | 5/1999 | McEwan |
| D411,071 S | 6/1999 | Cerda-Vicedo |
| 5,915,550 A | 6/1999 | Gartz |
| 5,931,294 A | 8/1999 | Weingarden et al. |
| 5,944,181 A | 8/1999 | Lau |
| 5,960,949 A | 10/1999 | Wynalda, Jr. |
| 5,988,375 A | 11/1999 | Chang |
| 5,996,788 A | 12/1999 | Belden, Jr. et al. |
| D420,240 S | 2/2000 | Sorenson et al. |
| D420,832 S | 2/2000 | Cole, Sr. |
| 6,032,795 A * | 3/2000 | Ehrlund et al. ............ 206/312 |
| D422,428 S | 4/2000 | Pijanowski et al. |
| 6,047,829 A * | 4/2000 | Johnstone et al. ........... 206/1.5 |
| 6,065,594 A | 5/2000 | Sankey et al. |
| D426,721 S | 6/2000 | Benden, Jr. et al. |
| D426,978 S | 6/2000 | Belden, Jr. et al. |
| 6,079,557 A | 6/2000 | Lammerant et al. |
| 6,085,900 A | 7/2000 | Wong |
| 6,092,650 A | 7/2000 | Budnik |
| 6,119,857 A | 9/2000 | Stumpff |
| 6,123,192 A | 9/2000 | Rufo, Jr. |
| D431,955 S | 10/2000 | Peterson et al. |
| D433,266 S | 11/2000 | Peterson et al. |
| 6,164,446 A | 12/2000 | Law |
| D439,435 S | 3/2001 | Belden, Jr. et al. |
| 6,196,384 B1 | 3/2001 | Belden, Jr. |
| D441,212 S | 5/2001 | Pijanowski et al. |
| 6,230,893 B1 * | 5/2001 | Karow ...................... 206/1.5 |
| 6,237,763 B1 | 5/2001 | Lau |
| 6,250,461 B1 | 6/2001 | Hu |
| 6,283,283 B1 | 9/2001 | Rufo, Jr. et al. |
| 6,283,286 B1 | 9/2001 | Hu |
| 6,293,396 B1 | 9/2001 | Takahashi et al. |
| D450,973 S | 11/2001 | Bieda |
| D451,747 S | 12/2001 | Tang |
| D452,104 S | 12/2001 | Tang |
| D452,105 S | 12/2001 | Chan |
| D452,793 S | 1/2002 | Lee |
| D453,081 S | 1/2002 | Yu |
| 6,354,435 B1 | 3/2002 | Belden, Jr. et al. |
| D455,312 S | 4/2002 | Myszka et al. |
| D457,010 S | 5/2002 | Flores, Jr. et al. |
| 6,401,920 B1 | 6/2002 | Gelardi |
| D459,935 S | 7/2002 | Takahashi et al. |
| 6,412,631 B1 | 7/2002 | Belden, Jr. |
| 6,415,918 B1 | 7/2002 | Wong et al. |
| 6,425,481 B1 | 7/2002 | Choi |
| 6,443,300 B1 | 9/2002 | Gelardi |
| D463,944 S | 10/2002 | Wynalda, Jr. et al. |
| D465,672 S | 11/2002 | Pijanowski et al. |
| D465,960 S | 11/2002 | Yau |
| 6,474,073 B1 | 11/2002 | Uetsuji et al. |
| 6,478,150 B1 | 11/2002 | Solling |
| D466,330 S | 12/2002 | Pijanowski et al. |
| 6,502,694 B1 | 1/2003 | Pijanowski et al. |
| 6,505,737 B1 | 1/2003 | Sherman |
| 6,516,945 B1 | 2/2003 | Myszka et al. |
| 6,554,132 B1 | 4/2003 | Lau |
| 6,626,291 B1 | 9/2003 | Pozzoli |
| 6,634,495 B1 | 10/2003 | Hass |
| 6,651,811 B1 | 11/2003 | Hai |
| 6,672,452 B1 | 1/2004 | Alves et al. |
| 6,675,960 B1 | 1/2004 | Innis |
| 6,683,847 B1 | 1/2004 | Kutaragi et al. |
| 2001/0021167 A1 | 9/2001 | Kutaragi et al. |
| 2001/0037953 A1 | 11/2001 | Gelardi |
| 2002/0040857 A1 | 4/2002 | Ho et al. |
| 2002/0053526 A1 | 5/2002 | Peterson et al. |
| 2002/0100701 A1 | 8/2002 | Chiu |
| 2002/0100702 A1 | 8/2002 | Belden, Jr. et al. |
| 2002/0112974 A1 | 8/2002 | Lau |
| 2002/0130056 A1 | 9/2002 | Pijanowski et al. |
| 2002/0134696 A1 | 9/2002 | Marsilio et al. |
| 2002/0139700 A1 | 10/2002 | Pozzoli |
| 2002/0153266 A1 | 10/2002 | Havens |
| 2002/0170837 A1 | 11/2002 | Belden, Jr. |
| 2002/0170838 A1 | 11/2002 | Marsilio et al. |
| 2002/0175097 A1 | 11/2002 | Hai |
| 2002/0179465 A1 | 12/2002 | Hui |
| 2003/0000852 A1 | 1/2003 | Broadhead |
| 2003/0000853 A1 | 1/2003 | Broadhead |
| 2003/0015443 A1 | 1/2003 | Flores, Jr. et al. |
| 2003/0017287 A1 | 1/2003 | Niitsuma et al. |
| 2003/0024835 A1 | 2/2003 | Sherman |
| 2003/0106814 A1 | 6/2003 | Gelardi et al. |
| 2003/0132126 A1 | 7/2003 | Parrotta et al. |
| 2003/0168361 A1 | 9/2003 | Lau |
| 2003/0211924 A1 | 11/2003 | Carney et al. |
| 2003/0213710 A1 | 11/2003 | Thompson et al. |
| 2003/0218971 A1 | 11/2003 | Rhodes |
| 2003/0226775 A1 | 12/2003 | Chung |
| 2004/0008613 A1 | 1/2004 | Beckwith et al. |

* cited by examiner

DISK PACKAGING

REFERENCE TO RELATED APPLICATION

This application claims priority to U.S. Provisional Application Ser. No. 60/424,518 filed on Nov. 7, 2002.

FIELD OF THE INVENTION

The invention relates generally to a packaging for machine readable disks, and more particularly to a packaging or case comprising a cradle and cover sleeves that are slidable for storing disks and the like.

BACKGROUND

Compact disks, CD-ROMs, and DVDs are typically packaged and sold in packaging that allows the disk to be stored in the packaging when not in use. DVDs are commonly sold in a case known as the Amaray case. Compact disks are often sold in what is known as a jewel case. These cases are used to store the disk while not in use, protecting the disk from dust particles and other debris. The cases also help to prevent the disk from being scratched when not in use.

A typical jewel case has a clear plastic cover that is connected to the base portion of the base by a hinge. A booklet with graphic materials and other information such as song lyrics, if the packaged disk is a CD, is typically placed in the inside portion of the jewel case cover. Although this provides a useful place for graphics, it prevents users from knowing whether the disk is in the case without actually opening the case.

SUMMARY

Certain embodiments of the present invention provide a packaging or case for compact disks (CDs), DVDs, and CD-ROMs and other similar storage media. The packaging may be used by manufacturers of disks for packaging disks for shipment to retail establishments. The disks may be displayed for sale at the retail establishment in the packaging according to certain embodiments of the present invention. After the packaging is opened for the first time, the disk may be replaced inside the case for storage purposes.

Certain embodiments of the present invention provide a packaging for disks that comprises both paperboard and plastic components and is easy to use. The packaging provides a plastic base comprising a cradle for the disk, but eliminates the plastic shell or cover of the jewel case. Certain embodiments of the present invention provide a paperboard cover to the plastic base. The paperboard cover is capable of being slid open to access the disk or to replace the disk in the case.

According to certain embodiments of the present invention, the plastic base may be mounted to a liner. Two separate paperboard sleeves may be used to cover the base and liner. The two sleeves, when pressed together, cover a portion of the stored disk. In this arrangement, the disk may not fall out of the base or be otherwise removed. However, a portion of the disk remains exposed so that users may visualize whether the disk is in the case or not, and even determine if the correct disk is in the case. This is because most disks are printed with indicia and graphics that are visible to the user when stored in the case according to certain embodiments of the present invention.

Disks stored in packaging according to certain embodiments of the present invention may be easily accessed. When stored, the two sleeves are forced together, closing the case. The sleeves each have an opening allowing visual access to the stored disk. In order to access the disk, the two sleeves may be slid apart. A stop mechanism prevents the sleeves from sliding completely off the plastic base and liner. The stops are designed so that the opening of each sleeve extends to the outer edge of the cradle when the sleeves are slid apart. Thus, the disk may be easily removed from the base.

The packaging according to certain embodiments of the present invention provides a paperboard cover, rather than the plastic cover of the typical jewel case. This provides a thinner packaging for DVDs and the like as compared to conventional packaging. Such thinner packaging is preferable because it conserves shipping costs by allowing more DVDs to be shipped per carton or truckload.

By providing a paperboard cover, certain embodiments of the present invention are more conducive to printing of graphical indicia and advertising material. Such indicia may be printed directly on the paperboard used to form the packaging. Furthermore, by using a clear plastic base, advertising and graphical indicia may be printed on the liner which can be seen by users when the disk is removed from the case.

DETAILED DESCRIPTION

Figure 1:
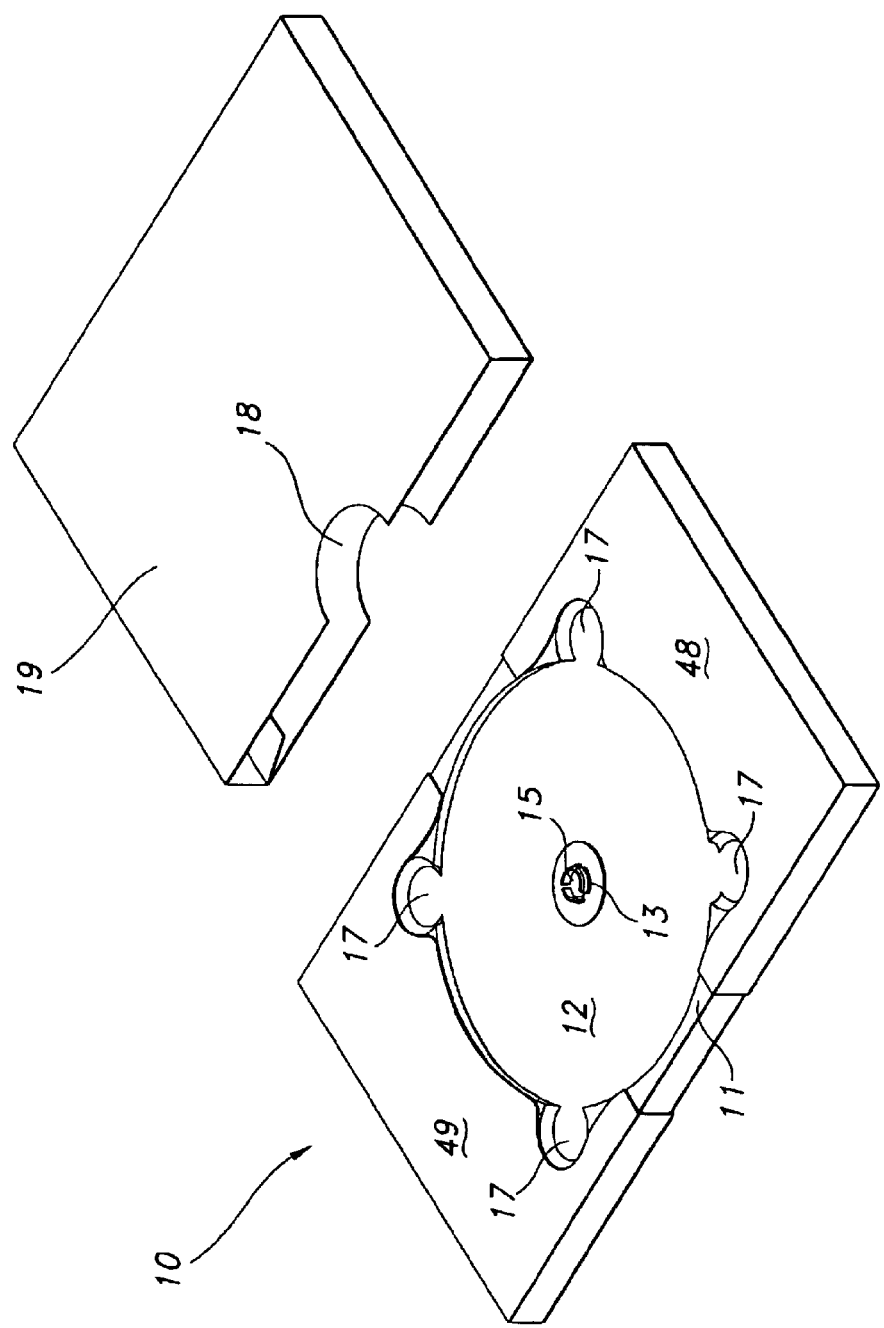
FIG. 1 is a pictorial view of the package in an open configuration and the sleeve.

Certain embodiments of the present invention provide a packaging or case for storing disks containing any type of media. As shown in FIG. 1, the packaging according to certain embodiments provides a case 10 for storing disks made from plastic and paperboard. A plastic base 11 is used to store the disk (not shown). Such plastic bases are standard in the industry, such as the base produced by DigiPack™. The plastic base is generally rectangular in shape. The interior of the base comprises a circular cradle 12 of approximately the same diameter as the disk to be stored. In the center of the cradle is a raised cylindrical protrusion 13, preferably formed from plastic. When placed in the cradle, the circular opening in the center of the disk is placed around the cylindrical protrusion, creating a friction fit between the disk and the outer surface of the cylindrical protrusion, preventing the disk from falling out of the cradle. The cylindrical protrusion comprises a molded plastic button 15 which, when depressed, releases the disk from the cradle. It should be understood that the size of the base and cradle may vary with respect to the type of disk intended to be sold and the industry standard base for such a disk. It should be understood that the base may be elongated and contain more than one cradle if it is desired for the case to hold multiple disks.

Figure 3:
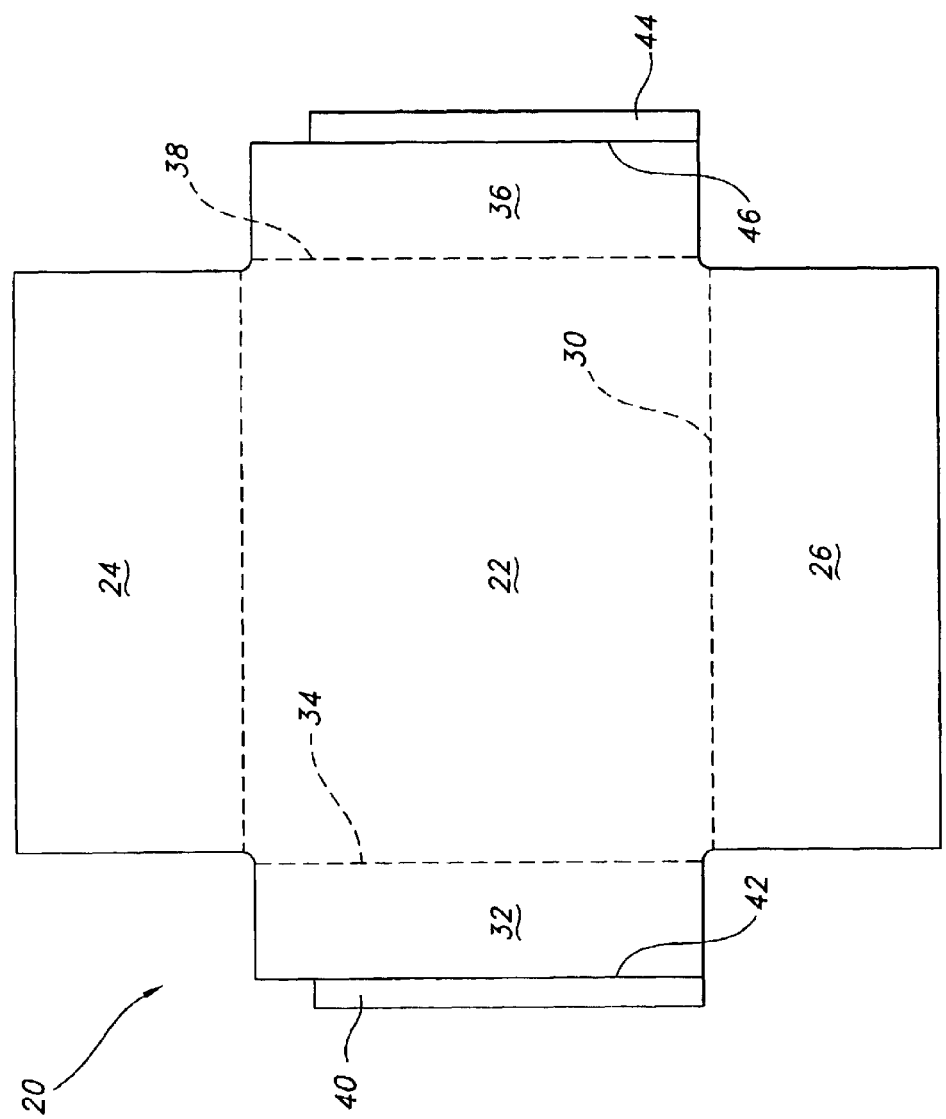
FIG. 3 is a top plan view of the blank of the liner according to certain embodiments of the invention.

The plastic base is preferably mounted to a liner 20 using an adhesive such as hot melt or tacky glue. The liner may be formed from a single blank, as shown in FIG. 3. The liner 20 comprises a body 22, preferably in the shape of a rectangle. The body is preferably sized to be substantially the same size as the rectangular portion of the plastic base. Two back flaps 24, 26 are attached to the body, one along a fold line 28 at the top of the body and the other along a fold line 30 at the bottom of the body. An end flap 32 is attached to a first end of the base along a fold line 34, and an end flap 36 is attached to the opposite end of the base along a fold line 38. A stop tab 40 is attached to the end panel 32 along a fold line 42 and extends outwardly, away from the body. A second stop tab 44 is attached to the end panel 36 along a fold line 46 and extends outwardly away from the body. The fold lines 42, 46 attaching the stop tabs to the end panels may be reverse cut-score fold lines. According to certain embodiment of the invention, the fold lines 42, 46 may be perforated fold lines.

Figure 9:
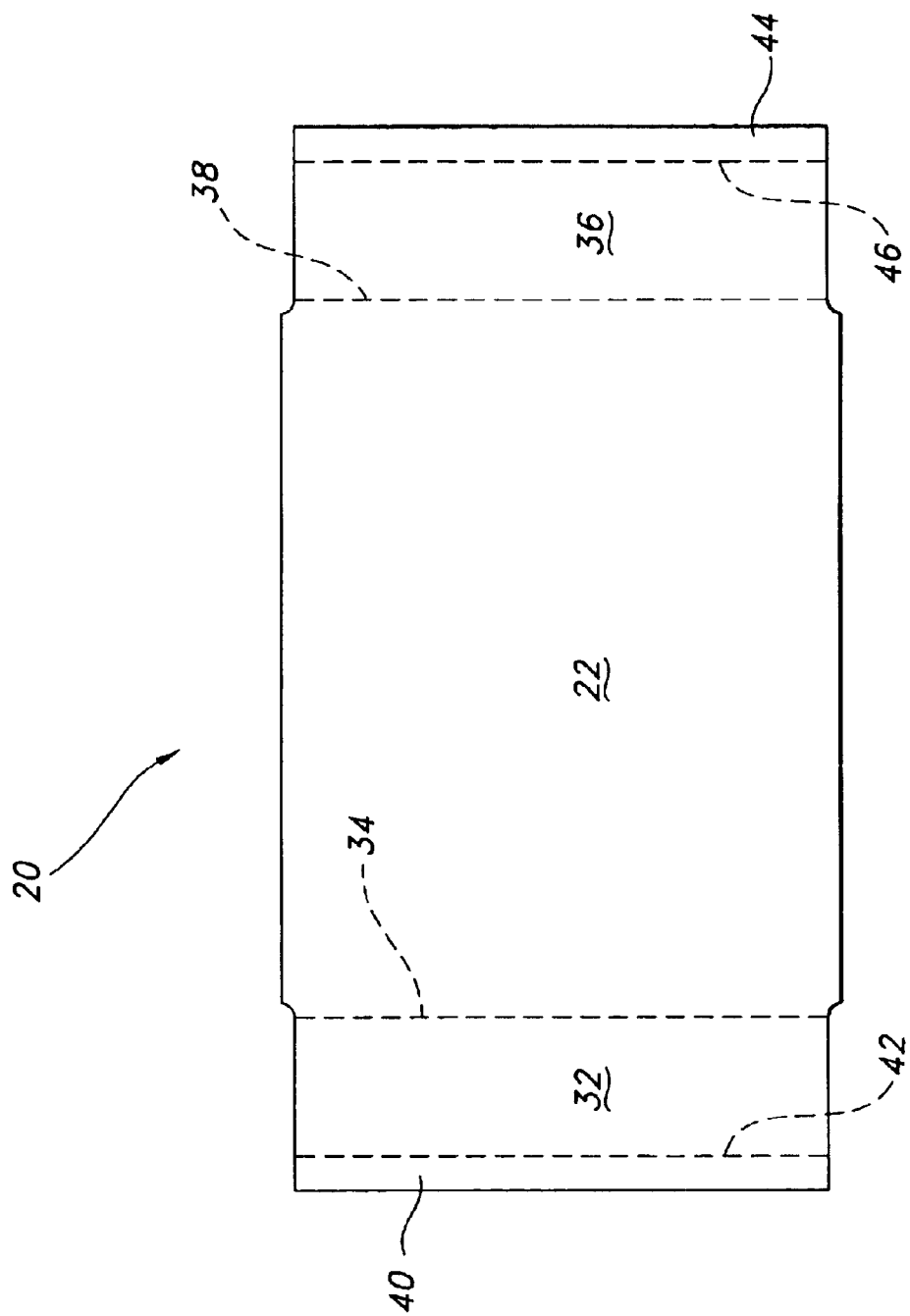
FIG. 9 is a top plan view of the blank of the liner according to certain embodiments of the invention.

The liner is assembled by adhering the base to the front portion of the body and folding the two back flaps 24, 26 backwards, away from the base, along the fold lines 28, 30, against the back portion of the body. The two back flaps are preferably sized so that the outer edge of the two back flaps are adjacent when the back flaps are folded backwards. The back flaps may preferably be adhered to the back portion of the body using an adhesive, forming a relatively smooth surface along the back of the body. According to certain embodiments of the invention, the liner may not comprise back flaps, as shown in FIG. 9, in which case the body is simply adhered to the base. The two end panels 32, 36 may be folded backwards along fold lines 34, 38, against the back flaps. The end panels may be adhered to the back flaps using an adhesive if desired. The stop tabs 40, 44 are then folded along the fold lines 42, 46 in the opposite direction as the end panels, forming a z-fold. The stop tabs are preferably not adhered to anything for reasons that will be described below.

Figure 4:
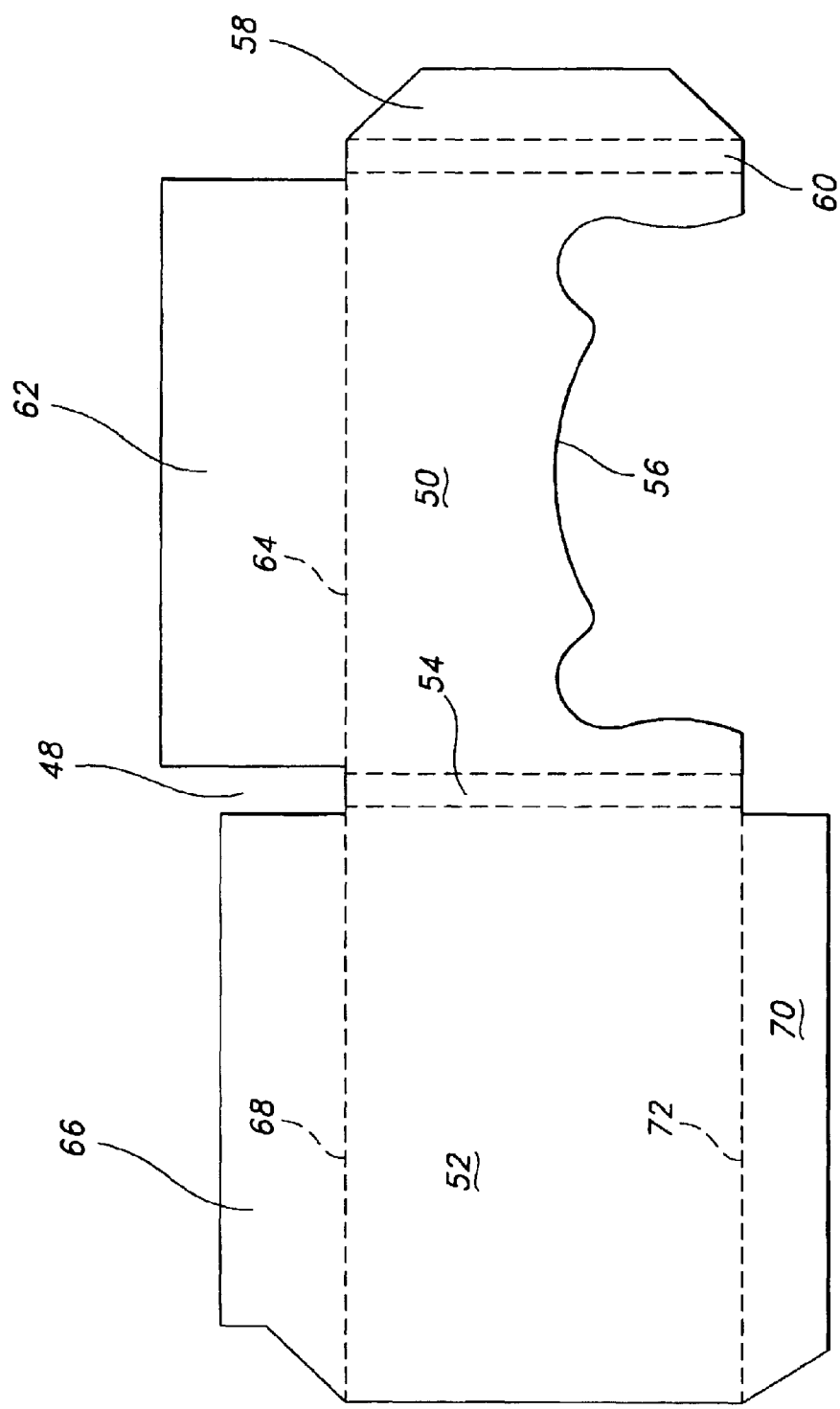
FIG. 4 is a top plan view of a blank of a sleeve according to certain embodiments of the invention.

According to certain embodiments of the present invention, each sleeve used to cover the base is formed from a single blank 48 as shown in FIG. 4. Each sleeve comprises a blank having a cover panel 50 attached to a back panel 52. The cover panel is attached to the back panel by a connecting strip 54. The connecting strip is preferably slightly wider than the thickness of the plastic base and liner when assembled for reasons that will be evident to those skilled in the art. An end tab 58 is attached to the cover panel by a connecting strip 60 located on the opposite end of the cover panel from the back panel. The end tab extends away from the cover panel. The cover panel preferably comprises a cut line 56 cut along a radius approximating the perimeter of a disk of the type to be stored in the package along one of the edges of the cover panel, between the back panel and the end tab. A side panel 62 is attached to the cover panel along a fold line 64 located opposite the edge of the cover panel comprising the cut line 56.

Figure 10:
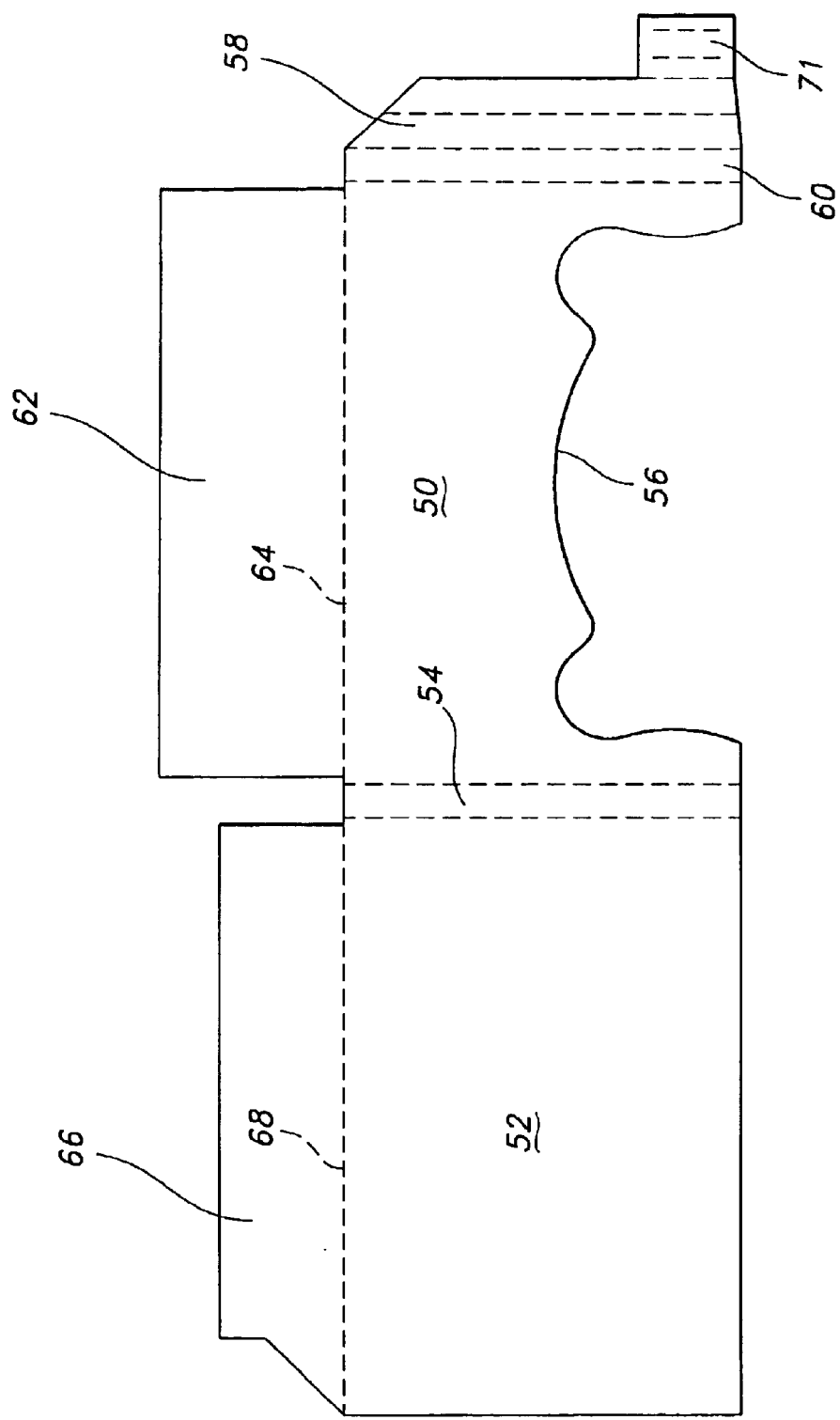
FIG. 10 is a top plan view of a blank of a sleeve according to certain embodiments of the invention.
Figure 11:
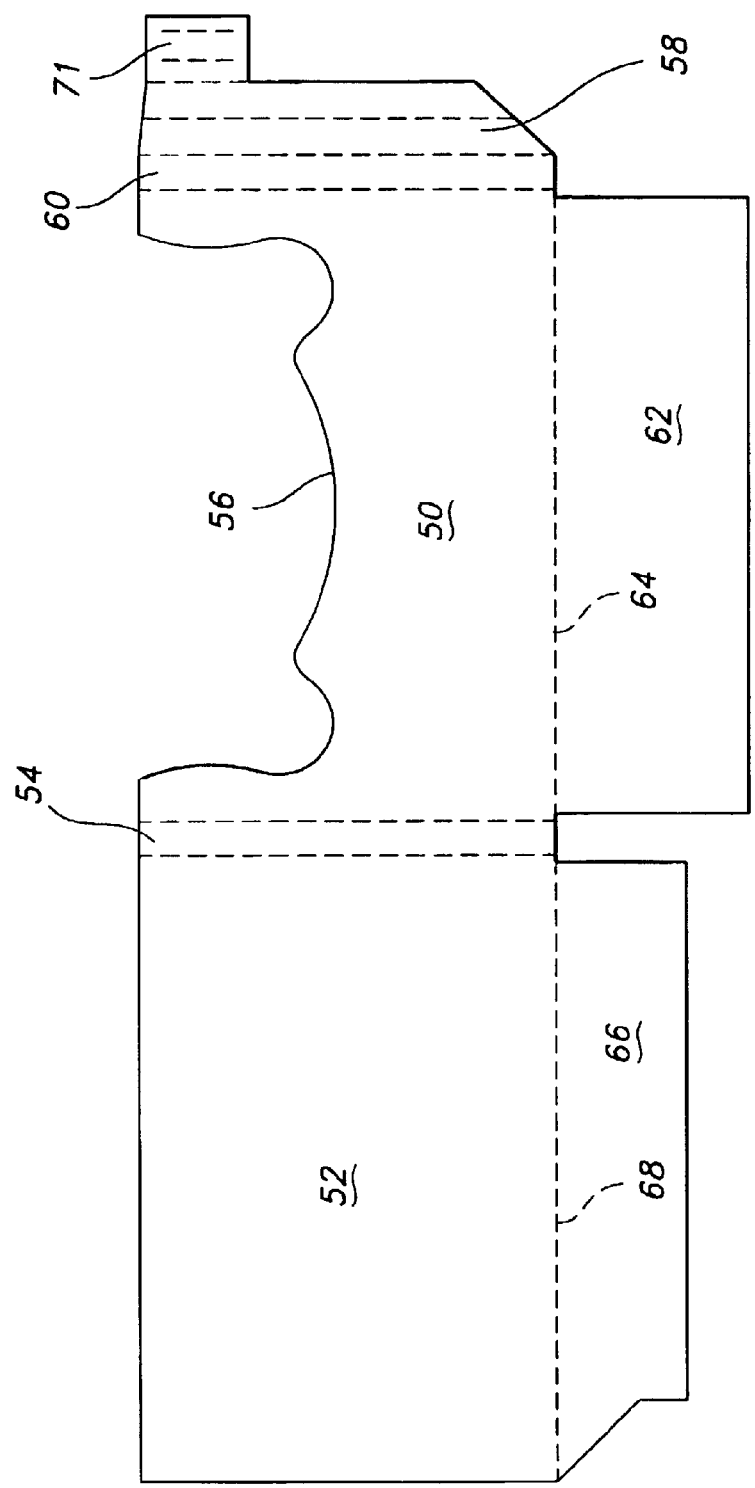
FIG. 11 is a top plan view of a blank of a sleeve according to certain embodiments of the invention.

The back panel 52 of the sleeve preferably comprises a rectangle. A first locking panel 66 is attached to the back panel along a fold line 68 located adjacent to the connecting strip 54. A second locking panel 70 is attached to the back panel along a fold line 72 located on the opposite side of the back panel from the first locking panel. According to certain embodiments of the present invention, a locking panel or tab 71 may be attached to the end tab 58 as shown in FIGS. 10 and 11. The locking tab 71 may preferably be used instead of the second locking panel 70 according to certain embodiments of the invention.

Figure 5:
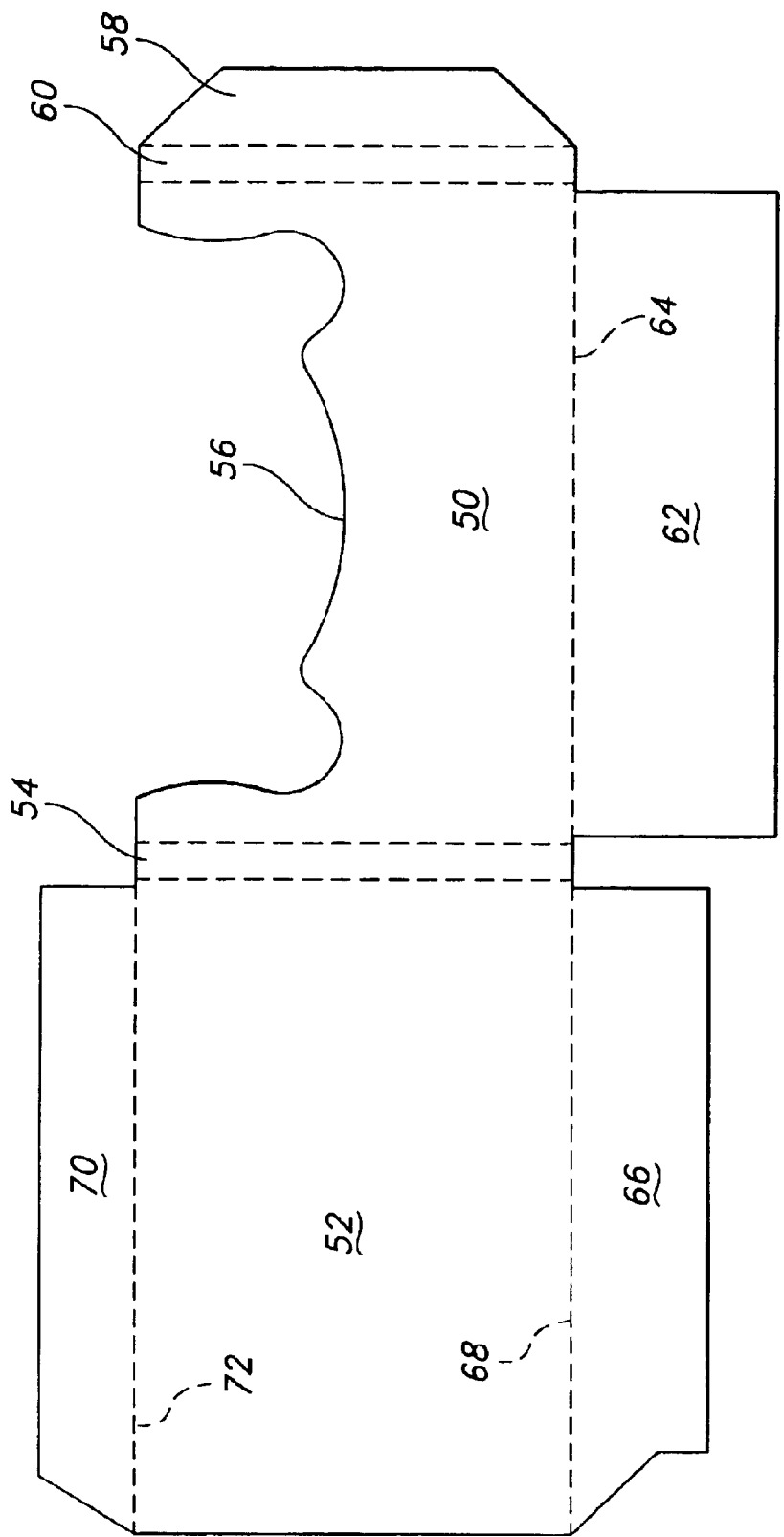
FIG. 5 is a top plan view of a blank of a sleeve according to certain embodiments of the invention.

The sleeve 48 may be formed by folding the locking panels 66, 70 backwards so that they are against the back side of the back panel. The locking panels may preferably be adhered to the back side of the back panel using an adhesive. The side panel 62 is also folded backwards so that it is against the back side of the cover panel where it may be adhered using an adhesive. If a blank containing locking tab 71 is used to form the sleeve, the locking tab 71 is folded against and adhered to the side panel 62. The blank is then folded along the two edges of the connecting strip 54 so that the back side of the cover panel is facing the back side of the back panel. The end tab 58 is then folded along the outside edge of the connecting strip 60 and adhered to the back side of the back panel. This preferably forms a sleeve wherein the cover panel and the back panel are separated by a distance approximately equal to the thickness of the connecting strips 54, 60. It should be understood that a second sleeve 49 may be formed in a similar manner using a separate blank as shown in FIG. 5. It should be further understood that the sleeves may be the same size if the cradle of the base is centered in the base. However, the cover panel and back panel of the sleeves may preferably be of different sizes if the cradle is not centered in the base, so that the sleeves may cover at least the entire side portions of the base when in the closed configuration.

Figure 2:
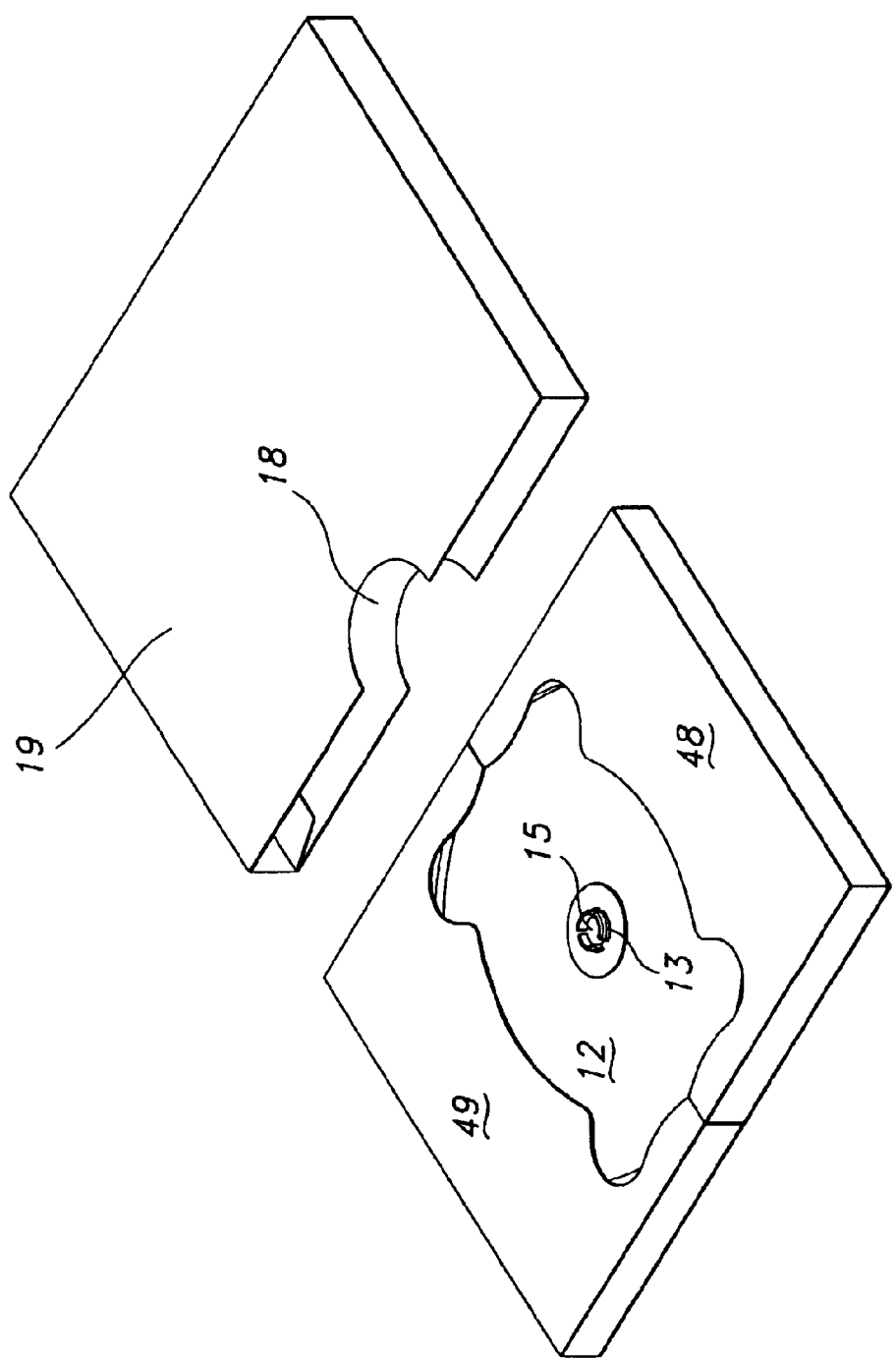
FIG. 2 is a pictorial view of the package in a closed configuration with the sleeve.
Figure 6:
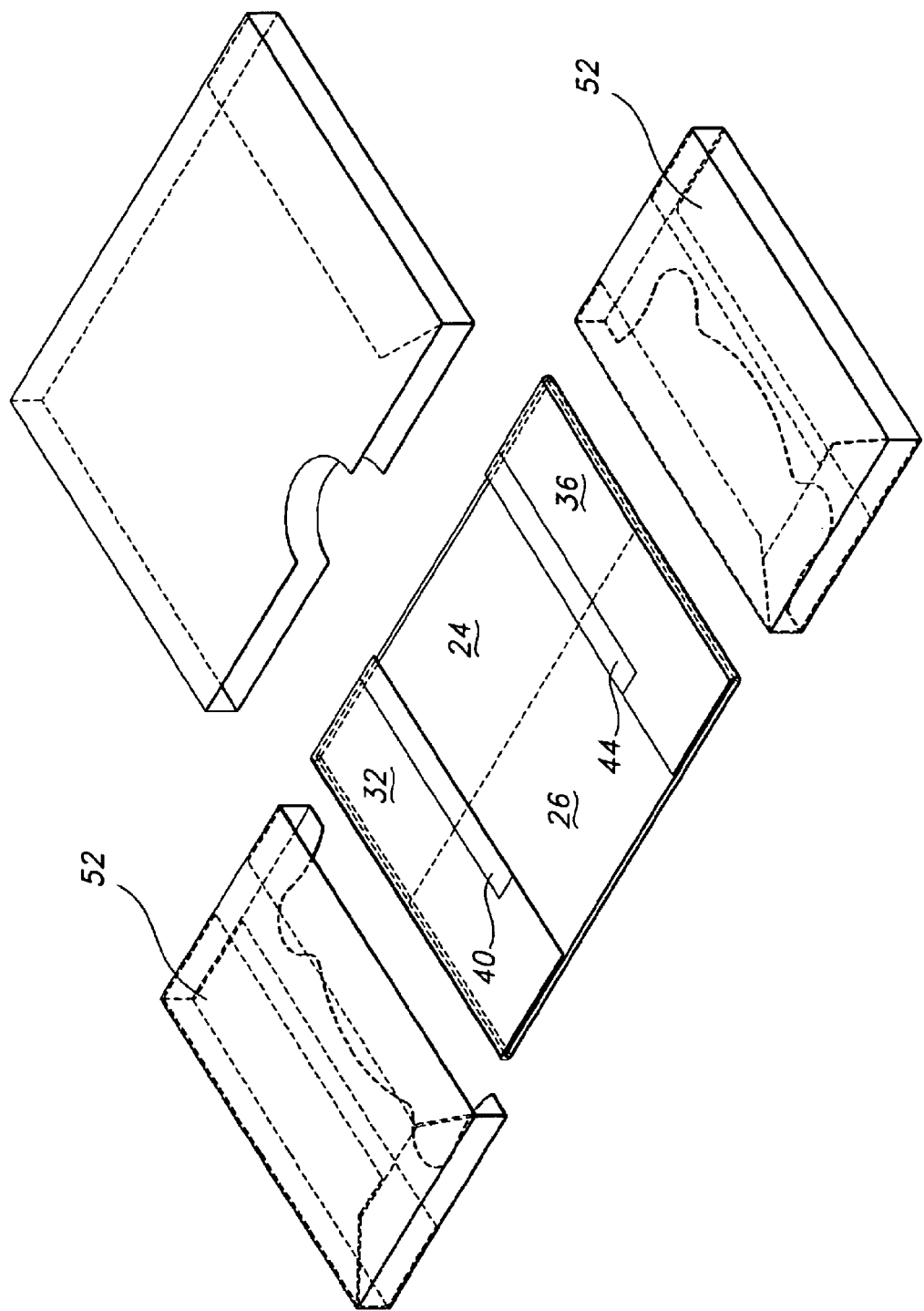
FIG. 6 is an exploded view of the bottom of the package according to certain embodiments of the invention.
Figure 7:
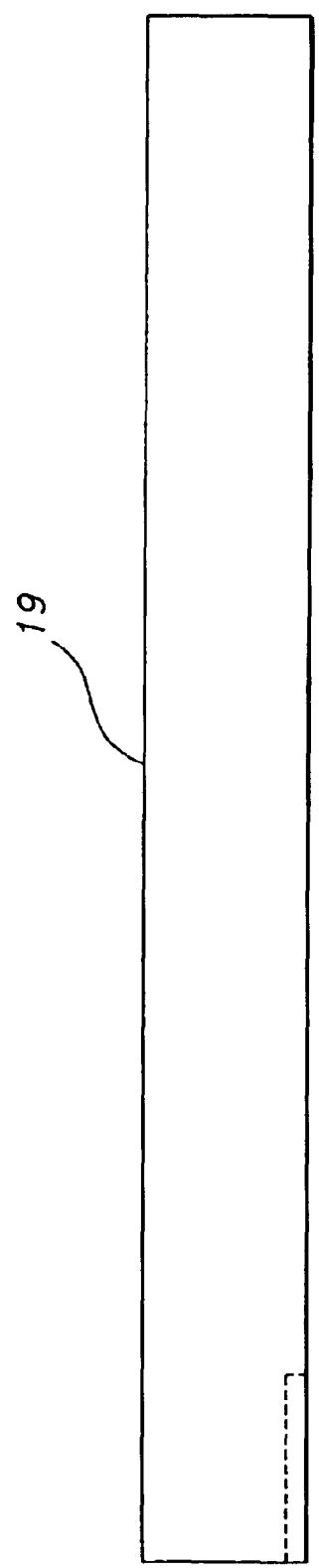
FIG. 7 is a side view of the outer cover according to certain embodiments of the invention.
Figure 8:
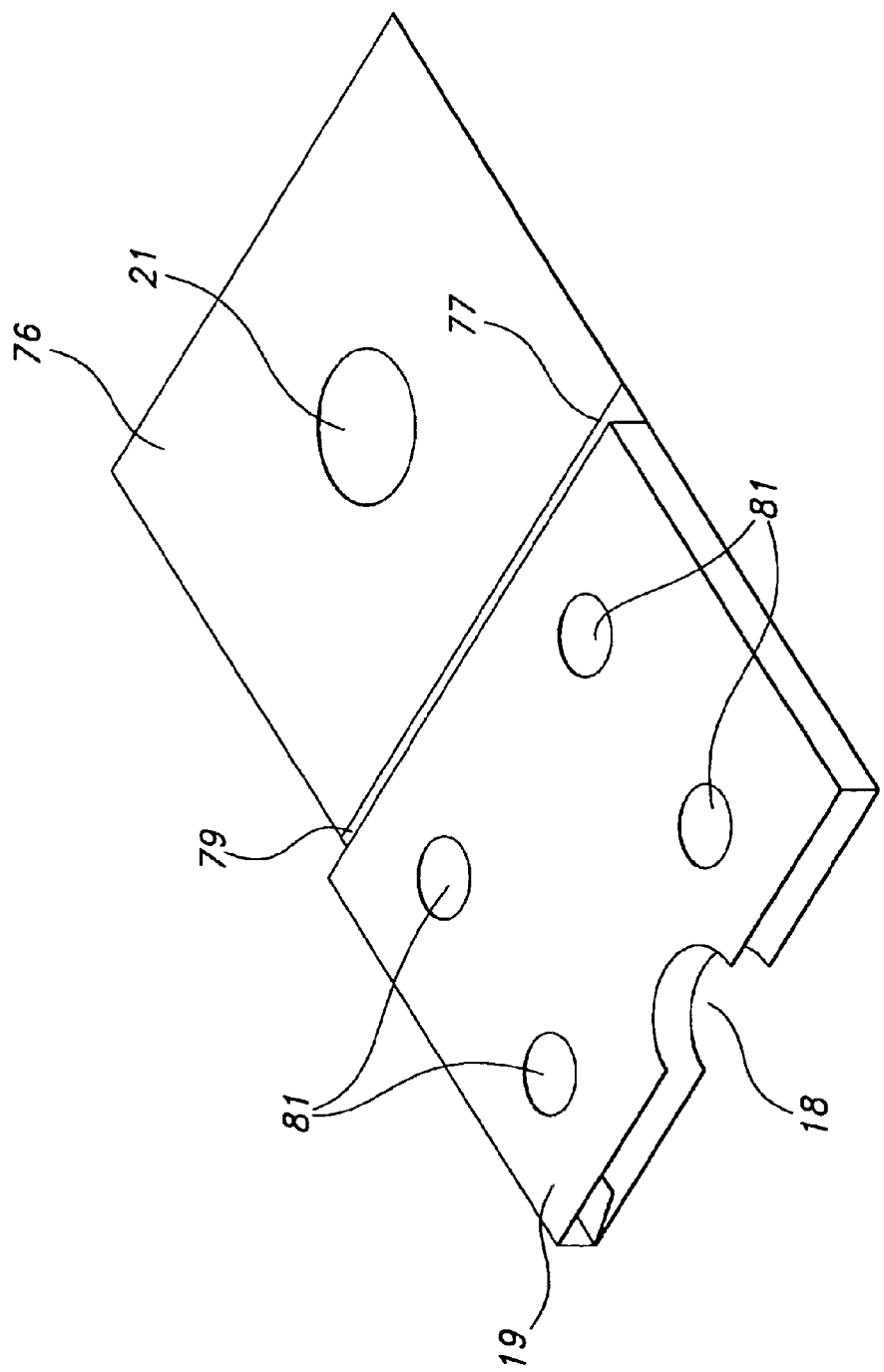
FIG. 8 is a pictorial view of an outer cover with a cover panel according to certain embodiments of the invention.

According to certain embodiments of the present invention, the sleeves are placed over the end portions of the base and liner. The sleeves may be slid together so that they meet at approximately the center portion of the cradle portion of the base as shown in FIG. 2. The stop tabs 40, 44 of the liner which are folded in a z-fold configuration engage the locking panels 68 of the sleeves to prevent the sleeves from sliding beyond the midpoint of the cradle. Similarly, when the sleeves are slid apart to open the case as shown in FIG. 1, the stop tabs abut the opposite locking panels 70 of each sleeve, preventing the sleeves from sliding off the base and liner. According to certain embodiments of the invention, if the locking tab 71 attached to the end tab is used, the locking tab 71 will engage the stop tab and prevent the sleeve from sliding off the base. Therefore, the interaction of the stopping tab of the liner and the locking panels of the sleeves creates a stopping mechanism when the case is being opened and closed as best shown in FIG. 6. It should be understood that the size of the locking panels are preferably determined to allow the sleeves to slide up to a point so that the cut line 56 of the cover panel is adjacent to the edge of the cradle, allowing access to the cradle and/or disk, when the stop tabs meets the locking panels in the open configuration. Similarly, the locking panels are sized so that the sleeves do not surpass the center portion of the cradle when the case is in the closed configuration. In the embodiment shown in FIGS. 4 and 5, the locking panel 70 which prevents the sleeve 48 from sliding too far when the cradle is being opened is preferably 0.8125 inches and the locking panel 66 which prevents the sleeves from sliding beyond the mid-point of the cradle when the case is being closed is preferably 1.1875 inches. The locking panel 66 of the second sleeve 49 is preferably 1.875 inches and the locking panel 70 is preferably 0.8125 inches as shown in FIG. 5. It should be understood that the size of the locking panels may be varied to accommodate different types of bases which may be designed for different types of disks and that the present description and drawings are only certain embodiments of the invention.

According to certain embodiments of the present invention, when the case is closed, the cut lines 56 of the cover panels of the sleeves create an opening providing visual access to the cradle. Users may therefore tell whether the disk is inside the case or even whether the correct disk is in the case if the disk has identification indicia printed on its face. The cut lines, which approximate the perimeter of the disk, form an oval type opening in the case when in the closed configuration. The opening is smaller than the disk, preventing the disk from being removed or falling out of the case when closed. When the sleeves are slid apart to open the case, the cut lines are positioned adjacent the outer edge of the cradle, forming a circular type shape which approximates the size of the disk. The cradle may thus be accessed to either remove or replace the disk, whichever is appropriate.

As shown in FIG. 1, the cradle of the base comprises four finger notches 17 for ease in removing the disk. The cut lines 56 therefore have been shown to approximate the outer edge of the finger notches as well as the remainder of the cradle. It should be understood that the cradle may not have any finger notches if desired or it may have some number of finger nothces other than four, however, the cut lines of the cover panels of the sleeves are preferably formed to approximate the outer edge of the cradle, whatever shape that may be.

Advertising and graphical indicia may be printed on the paperboard or other material forming the case. The cover panels of the sleeves in particular are well suited for such indicia and easily visible. The liner may also contain indicia which may be visible if the disk is removed and the base is made from a clear plastic. The remaining portions of the sleeves and the liner may contain indicia if desired.

An outer sleeve 19 may be used to provide further advertising space and protection for the disk. As shown in FIGS. 1 and 2, the outer sleeve has openings at each end and is slightly larger than the case when in the closed configuration. The case, when closed, may be slid into the outer sleeve, covering the opening of the case. Both sides of the outer sleeve may be printed with indicia if desired. Finger notches 18 located in the outer sleeve provide users with easy access to the case.

According to certain embodiments, the outer sleeve may comprise a cover panel 76. The cover panel may preferably be connected to the outer sleeve by a hinge panel 79. The hinge panel is preferably connected to the side of the sleeve opposite the finger notches 18. The cover panel 76 is preferably approximately rectangular and the same size as the outer sleeve. The cover panel can be folded along a fold line 77 connecting the cover panel to the hinge panel 79. The cover panel therefore provides a cover, which may be used for additional advertising indicia, for the packaging. According to certain embodiments, the outer sleeve may have one or more void sections 81, allowing visual access to the base, cradle, and disk. The cover panel may also comprise one or more void sections 81 if desired.

What is claimed is:

1. A disk packaging comprising:
   a generally rectangular base comprising a cradle for storing a disk on one side of the base;
   a liner adhered to the base on the side of the base opposite the cradle, the liner comprising at least first and second stop tabs; and
   a pair of sleeves, each sleeve comprising a cover panel, a back panel, and locking panels attached to the back panel of each sleeve, the locking panels located in the interior of the sleeve;
   whereby the sleeves are attached to the base and are positionable in a first position covering the cradle and preventing access to the cradle and a second position allowing access to the cradle, the sleeves slidable between the first and second position wherein the stop tabs engage the locking panels to prevent the sleeves from sliding off the base when sliding the sleeves from the first position to the second position.

2. The disk packaging of claim 1, wherein the stop tabs engage the locking panels when sliding the sleeves from the second position to the first position, preventing each sleeve from sliding beyond approximately the mid-point of the cradle.

3. The disk packaging of claim 1, wherein the liner comprises a generally rectangular base panel of approximately the same size as the base, two end panels and two stop tabs, the end panels foldably connected to each end of the base panel and the one stop tab foldably connected to each end panel, the end panels and the stop tabs folded in a z-fold configuration and adhered to the base panel.

4. The disk packaging of claim 1, further comprising finger notches adjacent to the cradle facilitating access to the disk when stored in the cradle and whereby the sleeves when in the second position do not cover the finger notches.

5. The disk packaging of claim 1, further comprising a cylindrical protrusion in the center of the cradle, the cylindrical protrusion engaging the central portion of the disk and securing the disk in the cradle.

6. The disk packaging of claim 1, wherein the base is plastic and the liner and sleeves are paperboard.

7. The disk packaging of claim 1, further comprising an outer sleeve covering the base and the sleeves, the outer sleeve printable with graphical indicia.

8. The disk packaging of claim 7, further comprising finger notches located on one end of the outer sleeve.

9. The disk packaging of claim 8, further comprising an cover panel foldably connected to the opposite end of the outer sleeve from the finger notches and printable with graphical indicia.

10. A packaging for machine readable disks comprising:
    a generally rectangular base comprising a circular at least one cradle for storing a disk on one side of the base;
    a liner adhered to the base on the side of the base opposite the cradle, the liner comprising a base panel, two end panels and first and second stop tabs; and
    a pair of sleeves, each sleeve comprising a cover panel, a back panel, and locking panels attached to the back panel of each sleeve, the locking panels located in the interior of the sleeve;
    whereby the sleeves are located on either end of the base and are positionable in a closed position covering the cradle and preventing access to the cradle and an open position allowing access to the cradle, the sleeves slidable between the closed and open position wherein the stop tabs of the liner engage the locking panels of the sleeves to prevent the sleeves from sliding off the base when sliding the sleeves from the closed position to the open position.

11. The packaging of claim 10, wherein the stop tabs engage the locking panels when sliding the sleeves from the open position to the closed position, preventing each sleeve from sliding beyond approximately the mid-point of the cradle.

12. The packaging of claim 10, wherein the base panel of the liner is generally rectangular and approximately the same size as the base, the end panels foldably connected to each end of the base panel and one stop tab foldably connected to each end panel, the end panels and the stop tabs folded in a z-fold configuration, the end panels adhered to the base panel and stop tabs adhered to the end panels.

13. The packaging of claim 10, further comprising finger notches adjacent to the cradle facilitating access to the disk when stored in the cradle and whereby the sleeves when in the open position do not cover the finger notches.

14. The packaging of claim 10, further comprising a cylindrical protrusion in the center of the cradle, the cylindrical protrusion engaging the central portion of the disk and securing the disk in the cradle.

15. The packaging of claim 10, wherein the base is plastic and the liner and sleeves are paperboard.

16. The packaging of claim 10, further comprising an outer sleeve covering the base and the sleeves.

17. The packaging of claim 16, further comprising finger notches located on one end of the outer sleeve.

18. The packaging of claim 17, further comprising an cover panel foldably connected to the opposite end of the outer sleeve from the finger notches, the outer sleeve and cover panel printable with graphical indicia.

19. A packaging for machine readable disks comprising:

a generally rectangular plastic base comprising a circular cradle for storing a disk on one side of the base;

a paperboard liner adhered to the base on the side of the base opposite the cradle, the liner comprising a base panel, two end panels and first and second stop tabs whereby the end panels are foldably connected to each end of the base panel and one stop tab is foldably connected to each end panel, the end panels and the stop tabs folded in a z-fold configuration, the end panels adhered to the base panel and stop tabs adhered to the end panels; and a pair of paperboard sleeves, each sleeve comprising a cover panel, a back panel, and locking panels attached to the back panel of each sleeve, the locking panels located in the interior of the sleeve;

an outer sleeve removably covering the base, liner, and paperboard sleeves;

whereby the paperboard sleeves are located on either end of the base and are positionable in a closed position covering the cradle and preventing access to the cradle and an open position allowing access to the cradle, the paperboard sleeves slidable between the closed and open position wherein the stop tabs of the liner engage the locking panels of the paperboard sleeves to prevent the paperboard sleeves from sliding off the base when sliding the paperboard sleeves from the closed position to the open position.

20. A disk packaging comprising:

a storage means for storing a disk;

a liner adhered to the storage means;

a pair of sleeves, each sleeve comprising a cover panel, a back panel, the sleeves positionable in a first position covering the storage means and preventing access to the disk and a second position allowing access to the disk, the sleeves slidable between the first and second position; and stopping means attached to the liner and locking means attached to the sleeves, the stopping means for engaging the locking means to prevent the sleeves from sliding off the base when sliding the sleeves from the first position to the second position.

* * * * *